Figure 1:
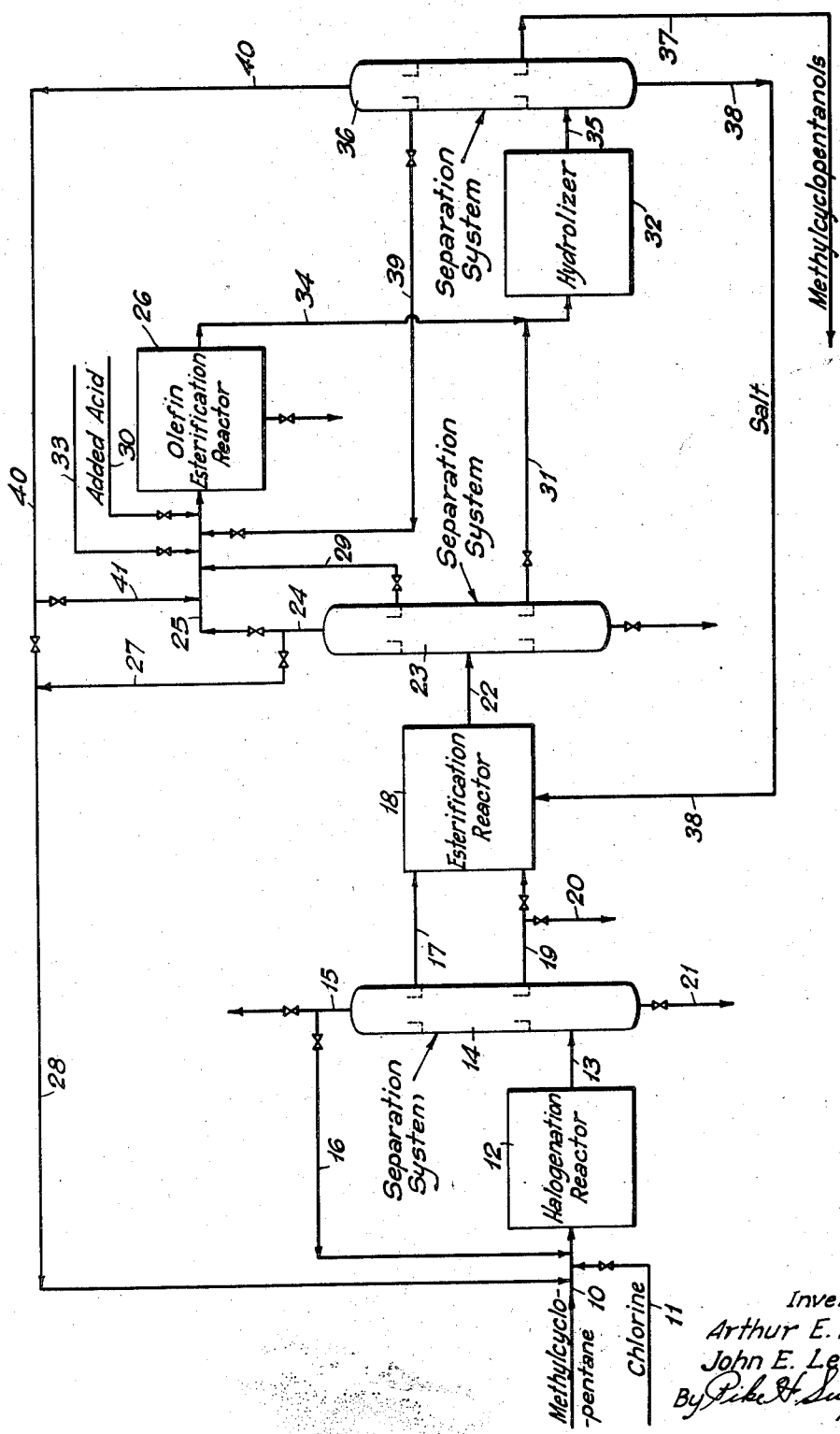

Inventors:—
Arthur E. Bearse
John E. Leonard
By *Pike H. Sullivan*
Attorney

Patented June 29, 1948

2,444,129

UNITED STATES PATENT OFFICE 2,444,129

PREPARATION OF CYCLOPENTYL ALCOHOLS

Arthur E. Bearse and John E. Leonard, Columbus, Ohio, assignors, by mesne assignments, to Standard Oil Company, Chicago, Ill., a corporation of Indiana Application October 27, 1944, Serial No. 560,680

19 Claims. (Cl. 260—617)

This invention relates to a novel process for the production of methylcyclopentanols, particularly secondary methylcyclopentanols. More particularly it relates to the production of methylcyclopentanols from methylcyclopentane.

The production of methylcyclopentanols from methylcyclopentane has not hitherto been accomplished, although at first appearance it might seem that such a synthesis could be readily carried out. We have found that when methylcyclopentane is subjected to chlorination to produce a monochloride and the latter is subjected to hydrolysis, the product is almost wholly a methylcyclopentene, rather than the desired methylcyclopentanol.

Since it is known that both cyclopentene (Yu. S. Zalkind and Markov, J. Appl. Chem. (U. S. S. R.) 11, 5, (May 1938) p. 818) and cyclohexene (U. S. Pat. 1,948,891; Zalkind and Markov, Russian Pat. 51,879—C. A. 33, 9328; Zalkind and Markov, J. App. Chem. (U. S. S. R.) 12, 3 (1939) pp. 437–9) are readily hydrated in good yields by dilute mineral acids to produce the corresponding monohydric alcohols, it would be expected that methylcyclopentene would likewise be readily hydratable. It has been found, however, that the treatment of methylcyclopentene with aqueous mineral acids under conditions commonly adopted for the hydration of olefins results substantially exclusively in the production of polymers rather than the desired production of methylcyclopentanols.

From the foregoing, it will be seen that the methods hitherto applied for the production of cycloaliphatic alcohols from the corresponding cycloparaffin or cyco-olefin are inapplicable to the production of methylcyclopentanols from methylcyclopentane or methylcyclopentenes. In fact, it has hitherto been considered impossible to produce methylcyclopentanols from methylcyclopentane, and these alcohols have been produced by hydrogenation of methylcyclopentanones which have in turn been prepared from methyl-adipic acids at great cost and in low yields.

It is an object of this invention to provide a process for the production of methylcyclopentanols, particularly secondary methylcyclopentanols, from methylcyclopentane. Another object of this invention is to provide a process for the production of methylcyclopentanols, particularly secondary methylcyclopentanols, from methylcyclopentenes. An additional object of this invention is to provide a process for the production of methylcyclopentanols from methylcyclopentyl esters.

Briefly, we have found that methylcyclopentanols can be prepared by converting methylcyclopentane to a methylcyclopentyl halide and/or methylcyclopentene, converting the said methylcyclopentyl halides and/or methylcyclopentenes to esters of carboxylic acids, and hydrolyzing the said esters.

Figure 1 is a schematic illustration of one embodiment of our invention. Methylcyclopentane, optionally together with methylcyclopentenes from a source hereinafter to be described, is passed via line 10 into a halogenation, e. g. chlorination, reactor 12. Chlorine is introduced via lines 11 and 10 into reactor 12. Depending upon the chlorination conditions and the specific composition of the feed stock, mono-, di-, or higher methylcyclopentyl chlorides are produced. The chlorination conditions can be adjusted to result primarily in the production of monochlorides. The chlorides may, if desired, be separated by fractionation and separately subjected to esterification, or a stream of the mixed chlorides can be esterified. It will be understood that in the event that methylcyclopentane is chlorinated to produce predominantly a monochloride fraction, the said fraction will contain a number of isomers, principally 2- and 3-methylcyclopentyl chlorides; minor proportions of 1-methylcyclopentyl chloride and cyclopentylmethyl chloride are usually present.

The chlorination products are passed by line 13 from the halogenation reactor into a separation system 14, which may suitably be a fractionating tower. In the separation system 14, a fraction comprising unreacted hydrocarbon feed is taken overhead via valved line 15 and may be recycled to the halogenation reactor via line 16. A methylcyclopentyl monochloride fraction boiling in the range of about 125–130° C. at atmospheric pressure is removed from separation system 14 via line 17 and is passed into an esterification reactor 18. A dichlorinated methylcyclopentane fraction is removed from separation system 14 via line 19, and may be sent to esterification reactor 18. Alternatively, the dichlorinated methylcyclopentanes may be rejected from the reaction system in whole or in part via valved line 20. High boiling residual material containing, largely, high boiling chlorides of methylcyclopentane may be rejected from separation system 14 and from the reaction system via valved line 21 or passed by lines not shown to the esterification reactor 18.

In the esterification reactor 18, the methylcyclopentyl chloride or mixture of methylcyclopentyl chlorides is subjected to reaction by heating under pressure with a dry salt of a carboxylic acid, e. g. sodium, potassium, calcium, lead, or the like acetates, formates, propionates, butyrates, benzoates, phthalates, or the like. Two major reactions occur, viz., the methylcyclopentyl chlorides are converted to esters and also to olefins by dehydrochlorination. Suitable esterification temperatures lie in the range of about 150–250° C. Under some conditions about 50% by weight of the methylcyclopentyl halide is converted to an ester and 50% to the corresponding olefin.

Products from the esterification reactor 18 are passed via line 22 into a separation system 23. Methylcyclopentene separated in this system can be cycled via valved line 24 and line 25 to an olefin esterification reactor 26. All or part of the methylcyclopentene separated in separation system 23 can be passed via lines 24, 27, and 28 to line 10 and thence to halogenation reactor 12. Free carboxylic acid produced in the esterification reactor 18 is separated in the separation system 23 and cycled via valve line 29 and line 25 to the olefin esterification reactor 26. Additional free carboxylic acid can be passed into the olefin esterification reactor 26 by lines 30 and 25. The methylcyclopentyl ester, e. g., acetate, is removed from the separation system 23 via line 31 and passed to a hydrolyzer 32.

In the olefin esterification reactor 26, methylcyclopentenes produced in the esterification reactor 18 and/or from an external source, such as catalytic dehydrogenation of methylcyclopentane, added via line 33, are esterified with carboxylic acid. It is preferable to carry out the methylcyclopentene esterification process in the presence of an esterification catalyst.

A wide variety of catalysts may be used for methylcyclopentene esterification. Thus, mineral acid catalysts such as sulfuric, phosphoric, hydrofluoric, hydrochloric or the like acid can be used; also organic acids such as benzene sulfonic or toluene sulfonic acids, $FSO_3H$, $BF_3$, $BF_3$ complexes with polar compounds such as water, ethers, alcohols, etc., $BF_3$-HF, and a wide variety of other catalysts. The specific esterification conditions which are chosen will depend upon the specific catalyst and feed stock to be used.

The methylcyclopentene esterification operation may be operated on a batch, semi-continuous or continuous basis, preferably the last. The following is an example of the type of operation contemplated in reactor 26. Methylcyclopentene is admitted continuously to a reaction mixture containing the desired carboxylic acid, e. g., acetic acid, and a small proportion, e. g., about 1 to 20 weight per cent of $BF_3$ and HF. The ratio of $BF_3$ to HF may be varied over the range of $\frac{1}{10}$ to $10\frac{1}{4}$ parts by weight. The reaction temperature used is in the range of about 25° C. to about 200° C., and the system is maintained under a pressure in the range of about 15 to about 150 p. s. i. Our preferred reaction temperature is in the range of about 80° C. to about 120° C. In this temperature range the autogenous pressure of the reaction system is about 30 to 40 p. s. i.

It is preferred to use, in esterification reactor 26, the carboxylic acid whose salt is employed in the esterification reactor 18. When certain catalysts such as HF or $HF$-$BF_3$ mixtures are used, anhydrides may be used in lieu of the carboxylic acids to produce esters. Products from the olefin esterification reactor 26 are passed, with or without intermediate separation or purification via valved line 34 to hydrolyzer 32.

In the hydrolyzer 32, the methylcyclopentyl esters produced in the esterification reactor 18 and in the olefin esterification reactor 26 are subjected to hydrolysis under conditions adapted to produce methylcyclopentanols. Although one hydrolyzer is shown, it should be understood that separate hydrolyzers may be used in the event that different methylcyclopentyl esters are produced in reactors 18 and 26.

The hydrolysis of methylcyclopentyl esters may be carried out by treatment with steam under pressure or by digesting with acidic or basic reagents. The well-known fat-splitting agents, especially the sulfonic acids such as mahogany acids, Turkey red oil, and the like, may be used to accelerate the rate of hydrolysis of the methylcyclopentyl esters. The hydrolysis of these esters proceeds readily and in substantially quantitative yields. For example, methylcyclopentyl acetates are converted in substantially quantitative yields to methylcyclopentanols by refluxing with a slight molar excess of 16% caustic for about six hours. Wetting or emulsifying agents promoting contact between the methylcyclopentyl esters and the hydrolyzing agent may be used, increasing the rate of hydrolysis.

We may use other ester-cleaving materials than water in order to produce methylcyclopentanols from the methylcyclopentyl esters in hydrolyzer 32. When cleavage solvents other than water are used, the cleavage process may be termed a "solvolysis." The cleavage solvent will contain an active hydrogen. Suitable solvents include (besides water) ammonia and alcohols, e. g., methanol, ethanol, isopropanol or the like. When alcohols are selected as cleavage solvents to liberate methylcyclopentanols from methylcyclopentyl esters, it is desirable to choose an alcohol whose ester, with the acid radical of the methylcyclopentyl ester, will boil at a temperature widely removed from the boiling points of the methylcyclopentanols in order to facilitate the separation of the methylcyclopentanols. It should also be noted that solvolysis reactions are reversible and may be driven to completion by removal of one of the reaction products, e. g., by distillation from the reaction mixture. Depending upon which is more volatile, the methylcyclopentanols or the ester of the cleaving alcohol may be distilled from the reaction mixture. Cleavage of the methylcyclopentyl esters by alcohols may be accelerated by the use of catalysts, such as strong mineral acids or, preferably, an alkali metal alcoholate such as sodium methylate.

Products pass from the hydrolyzer 32 via line 35 into a separation system 36, whence methylcyclopentanols are removed via line 37. When the hydrolysis conducted in hydrolyzer 32 is effected with the addition of a base, a salt of the carboxylic acid is produced from the ester and can be separated from the other hydrolysis products in the separation system 36 and recycled via line 38 to the esterification reactor 18, preferably after thorough purification and dehydration. Preferably the base used is such as will reconstitute the salt of the carboxylic acid which is reacted with the methylcyclopentyl halide. Alternatively this salt may be treated with a mineral acid, e. g., $H_2SO_4$, to regenerate the carboxylic acid which may be recycled (by lines not shown) to the olefin esterification reactor 26 or to the esterification reactor 18. When the hydrolysis in the hydrolyzer 32 is effected under acid conditions, the ester will be split into an alcohol and a carboxylic acid, the latter being recovered in the separation system 36 and recycled via line 39 to the olefin esterification reactor 26. In some instances methylcyclopentenes are produced in the hydrolysis operation and in that event they may be separated in separation system 36 and cycled via valved lines 40, 28, and 10 to the halogenation reactor 12 or via lines 40, 41, and 25 to the olefin esterification reactor 26.

A suitable system for separating the hydrolysis reaction products comprises fractionally distilling the mixture to separate methylcyclopentanols, and such methylcyclopentenes or carboxylic acids as may be formed leaving in the event that basic hydrolysis conditions are used, a bottoms comprising predominantly an aqueous solution of a carboxylic acid salt. A pure salt for recycle to the methylcyclopentyl halides esterification reactor 18, or for other disposition can be separated by evaporation of the aqueous bottoms and conventional purification techniques.

The above discussion was addressed primarily to the elucidation of the inter-relationships of the various operations required for the production of a methylcyclopentanol. Certain operations will be discussed in more detail below in order more fully to set forth our invention.

As has been previously indicated, the first step in our process comprises the conversion of methylcyclopentane to a methylcyclopentyl halide. This operation will be illustrated by reference to the conversion of methylcyclopentane to methylcyclopentyl chlorides. We have found that methylcyclopentane can be chlorinated either with dry or moist chlorine over a wide temperature range, e. g., temperatures in the neighborhood of 0° C. to reflux temperatures at atmospheric pressure, viz., about 70–85° C., the gaseous chlorine being bubbled, e. g., through a fritted glass plate, into a body of methylcyclopentane. It is desirable to illuminate the chlorination reaction mixture. A suitable source of illumination is a tungsten filament lamp, although other light sources may be used. Depending upon the reaction temperature and the rate of chlorine injection, the reaction period may vary in the range of about 2–20 hours, preferably about 2–10 hours. Under the range of conditions detailed above, 30–80% of the methylcyclopentane is converted to methylcyclopentyl chlorides, among which 2- and 3-methylcyclopentyl chlorides predominate. The chlorination operation detailed above yields very small proportions of 1-methylcyclopentyl chloride and cyclopentylmethyl chloride and somewhat larger although still relatively minor proportions of dichloromethylcyclopentanes.

The following is a suitable process for the chlorination of methylcyclopentane. Methylcyclopentane is heated in a glass reactor, the mixture being irradiated by means of a tungsten filament lamp. Chlorine injection is continued until approximately 7.5 gram atoms have been absorbed per 15 mols of hydrocarbon. The reaction mixture is then distilled through an efficient fractionating tower. Of the starting mixture, in a typical run, 51% by weight was recovered unchanged, 42% was converted into chlorination products, and 7% was not accounted for. The yields of chlorination products, based upon the weight of methylcyclopentane not recovered, were as follows: monochlorination products (predominantly secondary methylcyclopentyl chlorides), 64.6%; minor monochlorination products (largely cyclopentylmethyl chloride), 4.3%; dichlorination products, 16.4%.

As has been indicated generally in the foregoing description, methylcyclopentenes can be produced from methylcyclopentane by halogenation followed by dehydrohalogenation, or by dehydrogenation, preferably with catalysts. It has been indicated that appreciable yields of methylcyclopentenes are also produced by the reaction between methylcyclopentyl halides and salts of carboxylic acids, e. g., the reaction between a secondary methylcyclopentyl chloride and sodium acetate, formate, propionate, butyrate, benzoate, phthalate, or the like.

Figure 2:
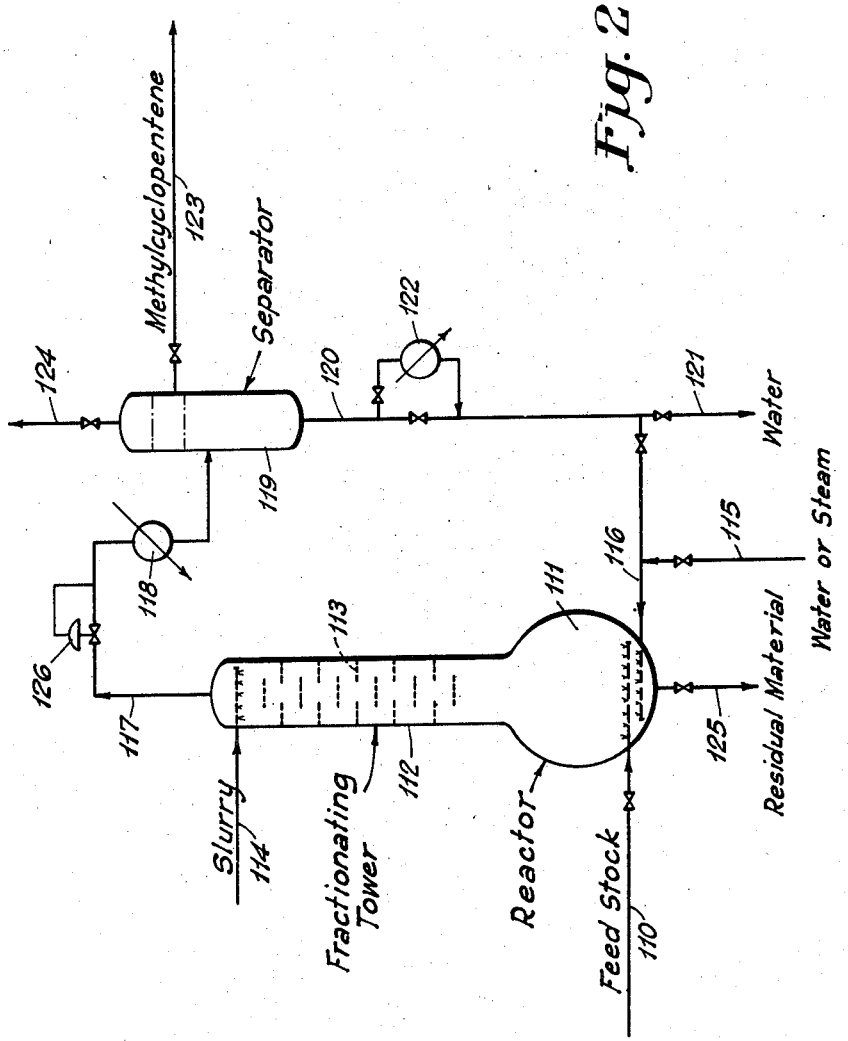

Figure 2 illustrates a process for preparing a methylcyclopentene from a methylcyclopentyl halide. A methylcyclopentyl halide, e. g., a secondary methylcyclopentyl monochloride or a fraction containing a substantial proportion of such a chloride, is introduced via line 110 into a reactor 111. Reactor 111 comprises a reaction zone which may suitably be in the form of a substantially horizontal spherical or cylindrical vessel, surmounted by one or more vertical fractionating towers 112, which in turn may be provided with fractionating devices such as metal or ceramic packing materials, bubble cap trays or the like, indicated generally by 113. The rate of dehydrohalogenation of the methylcyclopentyl halide may be greatly increased by the admission of basic materials to the reaction zone 111. Thus, alkali metal or alkaline earth metal hydroxides, carbonates, or bicarbonates may be admitted in solid form or, preferably, as a solution or slurry in a liquid such as water or methylcyclopentyl chloride. Solutions or slurries of these basic materials are preferably admitted to reactor 111 via line 114 in the fractionating tower 112. This mode of admitting basic materials to the reactor serves to combat acid corrosion which might otherwise occur in the fractionating tower 112, furnishes excellent contact between the basic material and methylcyclopentyl halide vapors and serves as a refluxing medium to control the temperature in the fractionating tower 112, while the slurry or solution is heated by direct heat exchange to a suitable reaction temperature. Water or steam is admitted to reactor 111 by lines 115 and 116. The water or steam aids in the removal of hydrogen halide from the methylcyclopentyl halide and serves also to produce a methylcyclopentene - water azeotrope which passes up through the fractionating tower 112, thence via an overhead line 117 through a condenser 118, and a separating drum 119. In the separating drum, a lower layer consisting principally of water is formed and may be recycled to reactor 111 via valved lines 120 and 116 or rejected from the system via line 121. The temperature of the recycled aqueous phase from the separator may be regulated by controlling the proportion of water passed through a bypass heater 122. The aqueous layer from separator 119 may also be stripped with steam or other stripping medium to recover organic material therefrom. The upper layer formed in separator 119 comprises principally methylcyclopentene which is withdrawn via line 123. Normally gaseous materials, e. g., hydrogen halides, are withdrawn from a separator 119 via valved line 124. Residual materials may be removed from reactor 111 via valved line 125. A pressure control valve, indicated by 126, serves to regulate the back pressure on the reaction and fractionation zones. It is generally desirable to operate reactor 111 and fractionation tower 112 under superatmospheric pressure to permit the use of elevated temperatures which will increase the rate of reaction.

The esterification of methylcyclopentyl halides will be described more specifically by reference to the esterification of a methylcyclopentyl chloride with dry sodium acetate to produce a methylcyclopentyl acetate. The type of esterification operations conducted in reactors 18 and 26 will be illustrated by reference to Figure 3, which to some extent eliminates the recycle lines from various of the other reaction and separation zones (as shown in Figure 1) in order to illustrate more clearly the specific operations being considered.

The reaction between methylcyclopentyl chloride or the like and sodium acetate or the like may suitably be effected at a temperature in the range of about 150–250° C., in a pressure tube or autoclave, preferably with stirring or agitation. Continuous, batch, or semi-continuous equipment may be used, as desired. Successful batch operations have been conducted in an autoclave operating under the autogenous pressure of the reaction system at 175–200° C., whereby complete conversion of the feed was obtained within five hours. It is preferred to use anhydrous sodium acetate since the introduction of water into the reaction zone has been found to decrease the rate of conversion as well as to reduce the ester/olefin ratio. Acetic anhydride or glacial acetic acid may be used as reaction solvents. Ester yields of the order of about 40 to 50 weight percent based on methylcyclopentyl chloride, corresponding to about 35–40% of theoretical can be obtained. Methylcyclopentene yields of the order of about 40 to 50 weight percent based on methylcyclopentyl chloride, corresponding to about 50–55% of the theoretical, can be obtained. Frequently the reaction mixture is a melt or solid mass or contains solid materials. Solid material or the reaction mixture is suitably treated by washing down with water to produce an aqueous layer and a non-aqueous layer which are separated from each other. The non-aqueous layer may be washed free of acid, e. g., by the use of water or dilute alkalies. From the non-aqueous layer methylcyclopentene, methylcyclopentyl acetate, acetic acid and any unconverted methylcyclopentyl chloride are recovered. The aqueous layer may be stripped with steam to recover organic materials carried thereby, and may be concentrated by evaporation to recover salts such as unconverted sodium acetate, which may be reused in the methylcyclopentyl chloride esterification process.

One method which may be employed to separate methylcyclopentene and acetic acid from the non-aqueous layer is frictional distillation, preferably under a reduced pressure and/or with the addition of azeotrope-forming agents such as water.

The separated acetic acid, optionally with added acetic acid from an external source, is esterified with the methylcyclopentene, preferably catalytically, to produce a further yield of methylcyclopentyl acetate.

A wide variety of esterification catalysts may be used, e. g., mineral acids such as sulfuric, phosphoric, hydrofluoric, hydrochloric, with or without promoters such as $BF_3$, $P_2O_5$, boric anhydride and the like; organic acids, such as petroleum sulfonic acids, e. g., mahogany acids, aryl sulfonic acids, alkyl sulfonic acids, alkyl sulfuric acids, etc.

We prefer, however, to use a composite esterification catalyst comprising $HF$ and $BF_3$, wherein the weight ratio of $HF$ to $BF_3$ may vary in the range of about 1/10 to about 10/1; this catalyst may be used in proportions of about 1 to about 20% by weight, based on feed. Suitable esterification temperatures fall within the range of about 25 to about 200° C. With our preferred $HF$-$BF_3$ esterification catalysts, temperatures within the range of about 50 to about 150° C. may be used, preferably temperatures within the range of about 80 to about 120° C.

Figure 3:
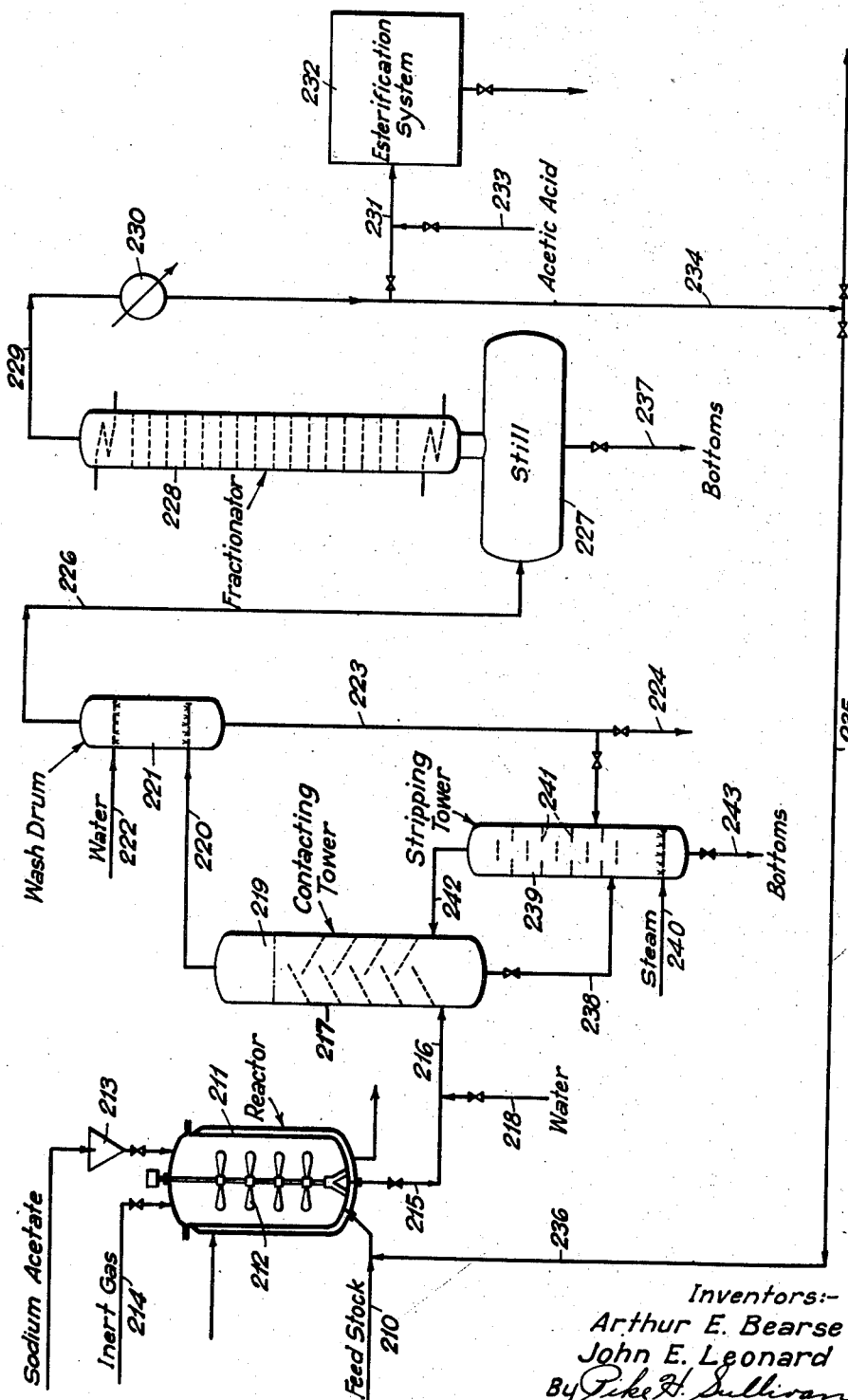

Figure 3 illustrates the operation of our esterification process, using a methylcyclopentyl chloride fraction boiling in the general vicinity of 125–130° C. as the feed stock. The methylcyclopentyl chloride enters through line 210 into a jacketed autoclave 211 provided with an efficient stirrer 212. Sodium acetate is introduced into the autoclave via hopper 213 or may be introduced wholly or in part as a slurry with the methylcyclopentyl chloride through line 210. Upon completion of the desired reaction, the reaction mixture is pressured by an inert gas entering the autoclave via valved line 214 through a valved outlet line 215 and line 216 into a pool of water in a baffled tower 217. Water may be intermittently or continuously passed into tower 217 via a valved line 218. A supernatant non-aqueous layer 219 is formed in the tower 217 and is withdrawn via line 220 to a washing drum 221 where acidic material is removed by a countercurrent flow of a suitable washing liquid such as water or a dilute base introduced via line 222. The washing liquid containing a small proportion of non-aqueous material is withdrawn from the washing drum via line 223 and may be rejected from the system or recycled to the washing drum via line 224 or, preferably, passed to a stripping tower 239. Neutral non-aqueous effluent from the wash drum 221 passes via line 226 into a still 227 surmounted by a fractionating tower 228. As shown, the fractionator 228 is operated on a batch basis but if continuous fractionation is desired it may be supplemented by a number of other fractionating towers. The first significant fraction to be removed will contain methylcyclopentenes and this will be passed via lines 229, condenser 230, and line 231 to an esterification system designated generally by the rectangle 232 (corresponding to olefin esterification reactor 26 of Fig. 1).

A fraction containing acetic acid will likewise be passed to the esterification system 232, preferably supplemented by acetic acid from an external source added through line 233. A fraction containing a large part of the unreacted methylcyclopentyl chloride is in due course, taken overhead via line 229 and may be recycled via lines 234, 235, and 236 to line 210 and autoclave 211. A methylcyclopentyl acetate fraction may be removed as bottoms from still 227 via valved line 237 and used with the methylcyclopentyl acetate produced in the methylcyclopentene esterification system, as the feed stock for a hydrolysis operation to yield methylcyclopentanols.

The aqueous phase in tower 217 containing a small proportion of non-aqueous material is withdrawn through valved line 238 into a stripping tower 239 provided with open steam line 240 and packing material, bubble cap plates or the like 241. The non-aqueous materials are stripped and pass overhead via line 242 back to tower 217. The aqueous bottoms leave stripper 239 via a valved line 243 and may be sent to evaporating

We claim:

1. A process for the production of a methylcyclopentanol, comprising halogenating methylcyclopentane to produce a methylcyclopentyl halide, subjecting said methylcyclopentyl halide to reaction with a substantially anhydrous salt of a carboxylic acid at a temperature in the range of about 150° C. to about 250° C. under pressure to produce a methylcyclopentyl ester of said carboxylic acid, and then hydrolyzing said methylcyclopentyl ester to produce a methylcyclopentanol.

2. A process for the production of a methylcyclopentanol comprising halogenating methylcyclopentane to produce a methylcyclopentyl halide, subjecting said methylcyclopentyl halide to reaction with a substantially anhydrous salt of a carboxylic acid to produce a methylcyclopentyl ester and a methylcyclopentene, subjecting said methylcyclopentene to esterification with a carboxylic acid to produce a methylcyclopentyl ester of said carboxylic acid, and converting the methylcyclopentyl esters derived from said methylcyclopentyl halide and from said methylcyclopentene to produce a methylcyclopentanol.

3. A process for the production of a methylcyclopentanol comprising halogenating methylcyclopentane to produce a methylcyclopentyl halide, subjecting said methylcyclopentyl halide to reaction with a substantially anhydrous salt of a carboxylic acid to produce a methylcyclopentyl ester and a methylcyclopentene by-product, subjecting said methylcyclopentene to esterification with a carboxylic acid to produce a methylcyclopentyl ester, subjecting the methylcyclopentyl esters derived from said methylcyclopentyl halide and from said methylcyclopentene to hydrolysis, recovering a methylcyclopentanol and a carboxylic acid from the said hydrolysis operation and recycling said carboxylic acid to the methylcyclopentene esterification operation.

4. A process for the production of a methylcyclopentanol comprising halogenating methylcyclopentane to produce a methylcyclopentyl halide, subjecting said methylcyclopentyl halide to reaction with a substantially anhydrous salt of a carboxylic acid at a temperature in the range of about 150° C. to about 250° C. under pressure to produce a methylcyclopentyl ester of the said carboxylic acid, subjecting said ester to hydrolysis with an aqueous solution of a base which will reconstitute said salt of a carboxylic acid upon reaction with said ester, separating a methylcyclopentanol and said salt and recycling said salt to react with an additional quantity of a methylcyclopentyl halide.

5. A process for the production of a methylcyclopentanol comprising halogenating methylcyclopentane to produce a methylcyclopentyl halide, subjecting said methylcyclopentyl halide to reaction with a substantially anhydrous salt of a carboxylic acid to produce a methylcyclopentyl ester and a methylcyclopentene, subjecting the said methylcyclopentene to esterification with a carboxylic acid to produce a methylcyclopentyl ester, subjecting the methylcyclopentyl esters derived from said methylcyclopentyl halide and from said methylcyclopentene to hydrolysis with an aqueous solution of a base which will reconstitute said salt of a carboxylic acid upon reaction with said esters, separating a methylcyclopentanol and said salt of a carboxylic acid from the hydrolysis operation and recycling said salt of a carboxylic acid to react with an additional quantity of methylcyclopentyl halide.

6. A process for the production of a methylcyclopentanol comprising halogenating methylcyclopentane to produce a mixture of methylcyclopentyl halides, separating methylcyclopentyl monohalides from said mixture, subjecting said methylcyclopentyl monohalides to reaction with a substantially anhydrous salt of a carboxylic acid at a temperature in the range of about 150° C. to about 250° C. under pressure to produce methylcyclopentyl esters of said carboxylic acid, hydrolyzing said methylcyclopentyl esters with an aqueous solution of a base which will reconstitute said salt of a carboxylic acid upon reaction with said esters, separating methylcyclopentanol and said salt from the hydrolysis operation and reacting said salt with a further quantity of a methylcyclopentyl halide.

7. A process for the production of a methylcyclopentanol comprising halogenating methylcyclopentane to produce methylcyclopentyl halides, separating methylcyclopentyl monohalides, subjecting said methylcyclopentyl monohalides to reaction with a substantially anhydrous salt of a carboxylic acid at a temperature in the range of about 150° C. to about 250° C. under pressure to produce a methylcyclopentyl ester, and converting said methylcyclopentyl ester to produce a methylcyclopentanol.

8. The process of claim 7 wherein the methylcyclopentyl monohalides which are separated are secondary methylcyclopentyl monohalides.

9. The process of claim 7 wherein halogenation of methylcyclopentane is effected with chlorine and wherein secondary methylcyclopentyl monochlorides are separated from the halogenation process and subjected to reaction with a substantially anhydrous salt of a carboxylic acid.

10. A process for the production of a methylcyclopentanol comprising chlorinating methylcyclopentane to produce methylcyclopentyl chlorides, separating methylcyclopentyl monochlorides, subjecting said methylcyclopentyl monochlorides to reaction with substantially anhydrous sodium acetate at a temperature in the range of about 175° C. to about 200° C. under pressure to produce methylcyclopentyl acetates, and converting said methylcyclopentyl acetates to produce a methylcyclopentanol.

11. The process of claim 10 wherein the methylcyclopentyl monochlorides which are separated are secondary monocyclopentyl monochlorides.

12. A process for the production of a methylcyclopentanol comprising halogenating methylcyclopentane to produce methylcyclopentyl halides, separating methylcyclopentyl monohalides, subjecting said methylcyclopentyl monohalides to reaction with a substantially anhydrous salt of a carboxylic acid to produce a methylcyclopentyl ester and a methylcyclopentene, subjecting said methylcyclopentene to esterification with a carboxylic acid to produce a methylcyclopentyl ester of said carboxylic acid, and converting the methylcyclopentyl esters derived from said methylcyclopentyl monohalides and from said methylcyclopentene to produce a methylcyclopentanol.

13. The process of claim 12 wherein the methylcyclopentyl monohalides which are separated are secondary methylcyclopentyl monohalides.

14. A process for the production of a methylcyclopentanol comprising chlorinating methylcyclopentane to produce methylcyclopentyl chlorides, separating methylcyclopentyl monochlorides, subjecting said methylcyclopentyl monochlorides to reaction with substantially anhydrous sodium acetate at a temperature in the range of about 175 to about 200° C. under pressure to produce methylcyclopentyl acetates and a methylcyclopentene, subjecting said methylcyclopentene to esterification with acetic acid in the presence of an esterification catalyst at a temperature in the range of about 80 to about 120° C. to produce a methylcyclopentyl acetate, and converting the methylcyclopentyl acetates derived from said methylcyclopentyl monochlorides and from said methylcyclopentene to produce a methylcyclopentanol.

15. The process of claim 14 wherein the esterification catalyst consists essentially of $BF_3$ and $HF$.

16. A process for the production of a methylcyclopentanol comprising chlorinating methylcyclopentane to produce methylcyclopentyl chlorides, separating methylcyclopentyl monochlorides, subjecting said methylcyclopentyl monochlorides to reaction with a substantially anhydrous salt of a carboxylic acid at a temperature in the range of about 150° C. to about 250° C. under pressure to produce a methylcyclopentyl ester, and converting said methylcyclopentyl ester to produce a methylcyclopentanol.

17. A process for the production of a methylcyclopentanol comprising chlorinating methylcyclopentane to produce methylcyclopentyl chlorides, separating methylcyclopentyl monochlorides, subjecting said methylcyclopentyl monochlorides to reaction with substantially anhydrous sodium acetate at a temperature in the range of about 150° C. to about 250° C. under pressure to produce methylcyclopentyl acetates, and converting said methylcyclopentyl acetates to produce a methylcyclopentanol.

18. A process for the production of a methylcyclopentanol comprising halogenating methylcyclopentane under conditions adapted to produce principally methylcyclopentyl monohalides, subjecting the mixture of methylcyclopentyl halides thus produced to reaction with a substantially anhydrous salt of a carboxylic acid at a temperature in the range of about 150° C. to about 250° C. under pressure to produce methylcyclopentyl esters, and converting said methylcyclopentyl esters to produce methylcyclopentanols.

19. A process for the production of a methylcyclopentanol comprising chlorinating methylcyclopentane under conditions adapted to produce principally methylcyclopentyl monochlorides, subjecting the mixture of methylcyclopentyl chlorides thus produced to reaction with a substantially anhydrous salt of a carboxylic acid at a temperature in the range of about 150° C. to about 250° C. under pressure to produce methylcyclopentyl esters, and converting said methylcyclopentyl esters to produce methylcyclopentanols.

ARTHUR E. BEARSE.
JOHN E. LEONARD.

REFERENCES CITED

The following references are of record in the file of this patent:

UNITED STATES PATENTS

| Number | Name | Date |
|---|---|---|
| 1,148,258 | Sparre | July 27, 1915 |
| 1,459,971 | Carter | June 26, 1923 |
| 2,318,033 | Griendt | May 4, 1943 |